US012607565B2

(12) United States Patent
Billsten

(10) Patent No.: US 12,607,565 B2
(45) Date of Patent: Apr. 21, 2026

(54) METHOD FOR IDENTIFYING A SET OF CANDIDATE SUBSTANCES USING A RAMAN SPECTROSCOPY DEVICE, A RAMAN SPECTROSCOPY DEVICE AND A NON-TRANSITORY COMPUTER-READABLE STORAGE MEDIUM

(71) Applicant: SERSTECH AB, Lund (SE)

(72) Inventor: Peter Billsten, Veberöd (SE)

(73) Assignee: SERSTECH AB, Lund (SE)

( * ) Notice: Subject to any disclaimer, the term of this patent is extended or adjusted under 35 U.S.C. 154(b) by 168 days.

(21) Appl. No.: 18/724,274

(22) PCT Filed: Dec. 15, 2022

(86) PCT No.: PCT/EP2022/086122
§ 371 (c)(1),
(2) Date: Jun. 26, 2024

(87) PCT Pub. No.: WO2023/126197
PCT Pub. Date: Jul. 6, 2023

(65) Prior Publication Data
US 2025/0067676 A1      Feb. 27, 2025

(30) Foreign Application Priority Data

Dec. 28, 2021      (EP) ..................................... 21217937

(51) Int. Cl.
*G01N 21/65* (2006.01)
*G01N 21/01* (2006.01)

(52) U.S. Cl.
CPC ............. *G01N 21/65* (2013.01); *G01N 21/01* (2013.01); *G01N 2021/0125* (2013.01);
(Continued)

(58) Field of Classification Search
CPC ................... G01N 21/65; G01N 21/01; G01N 2021/0125; G01N 2021/0181;
(Continued)

(56) References Cited

U.S. PATENT DOCUMENTS

| 8,325,337 B2 * | 12/2012 | Sinfield ................... G01J 3/021 |
| | | 250/203.2 |
| 2014/0004559 A1 | 1/2014 | Hill et al. |
| 2020/0064270 A1 | 2/2020 | Bartholomew |

OTHER PUBLICATIONS

International Search Report and Written Opinion for International Application No. PCT/EP2022/086122, mailed Feb. 3, 2023, (11 pages).

(Continued)

*Primary Examiner* — Thanh Luu
*Assistant Examiner* — Mai Thi Ngoc Tran
(74) *Attorney, Agent, or Firm* — Kagan Binder, PLLC

(57) ABSTRACT

The present inventive concept relates to a method (100) for identifying a set of candidate substances of a sample (10) using a Raman spectroscopy device (200). The method (100) comprises recording (120) a Raman spectrum using an exposure time, and recording (162) a further Raman spectrum using a further exposure time. The further Raman spectrum may exhibit Raman peaks not recorded/detected in the Raman spectrum which possibly reduces the set of candidate substances. If necessary, one or more additional Raman spectra are recorded to further reduce the set of candidate substances, such that a single candidate substance eventually remains, thereby deemed to be a substance of the sample (10). A Raman spectroscopy device (200), a computer program and a non-transitory computer-readable storage medium are also provided.

18 Claims, 5 Drawing Sheets

(52) U.S. Cl.
CPC ................ *G01N 2021/0181* (2013.01); *G01N 2201/0221* (2013.01); *G01N 2201/13* (2013.01)

(58) Field of Classification Search
CPC ....... G01N 2201/0221; G01N 2201/13; G01N 2021/4709; G01N 2201/124; G01J 3/44
See application file for complete search history.

(56) References Cited

OTHER PUBLICATIONS

Axelsson et al., "Detection and Classification of Explosive Substances in Multi-Spectral Image Sequences Using Linear Subspace Matching," 2013 IEEE International Conference on Acoustics, Speech and Signal Processing, pp. 3492-3496, Oct. 2013, (5 pages).
Stopar et al., "Raman efficiencies of natural rocks and minerals: Performance of a remote Raman system for planetary exploration at a distance of 10 meters," Spectrochimica Acta Part A: Molecular and Biomolecular Spectroscopy, vol. 61, Issue 10, Aug. 2005, pp. 2315-2323, (9 pages).

* cited by examiner

*100*

110 — Setting an exposure time

120 — Recording a Raman spectrum

130 — Identifying a large-intensity Raman peak

140 — Determining a Raman shift of the Raman peak

150 — Comparing the Raman shift against a database

160 — Reducing a set of candidate substances

*160*

161 — Setting a further exposure time being longer than the exposure time

162 — Recording a further Raman spectrum using the further exposure time

163 — Identifying a further Raman peak

164 — Determining a further Raman shift of the further Raman peak

165 — Comparing the further Raman shift against the database

166 — Excluding substances from the set of substances

METHOD FOR IDENTIFYING A SET OF CANDIDATE SUBSTANCES USING A RAMAN SPECTROSCOPY DEVICE, A RAMAN SPECTROSCOPY DEVICE AND A NON-TRANSITORY COMPUTER-READABLE STORAGE MEDIUM

CROSS-REFERENCE TO RELATED APPLICATIONS

This application claims priority to International Application No. PCT/EP2022/086122, filed Dec. 15, 2022 and titled "METHOD FOR IDENTIFYING A SET OF CANDIDATE SUBSTANCES USING A RAMAN SPECTROSCOPY DEVICE, A RAMAN SPECTROSCOPY DEVICE, AND A NON-TRANSITORY COMPUTER-READABLE STORAGE MEDIUM," which in turn claims priority from a European Patent Application having Ser. No. 21/217,937.8, filed Dec. 28, 2021, both of which are incorporated herein by reference in their entireties.

TECHNICAL FIELD

The present disclosure relates to a method for identifying a set of candidate substances using a Raman spectroscopy device, a Raman spectroscopy device, a computer program and a non-transitory computer-readable storage medium on which the method is implemented.

BACKGROUND

To detect and to determine different substances is highly desired in a large variety of applications ranging from chemical analysis to in-field determination of potentially hazardous and toxic substances. In many situations correct determination of a substance is of utmost importance. For instance, to be able to determine if a substance is hazardous, e.g. explosive, or not is critical since a wrongful determination may result in severe consequences potentially with personnel injuries and material losses. Similarly, it may also be critical to determine if a substance is toxic or not since a wrongful determination may result in serious consequences involving personnel and environmental risks. Further, it is highly important to verify that a drug is correctly synthesized since a wrongfully synthesized drug may become harmful instead of curative for a subject.

When detecting and determining different substances different approaches may be used.

A common way used to investigate properties of a substance is to let the substance undergo a chemical analysis. A chemical analysis of a substance is often accurate but is typically suffering from complexity and the time required for the analysis. Moreover, chemical analysis often require that various further substances or analytes are used or involved in the analysis. Such analysis therefore tends to become costly and time consuming. Another drawback resides in that such analysis are generally too complicated and time consuming to be conducted under field conditions.

Another commonly used approach for detecting and determining different substances is to use some form of spectroscopic analysis. A common type of spectroscopy used in this case is optical spectroscopy where light having interacted with the substance in question is analyzed using a spectrometer. The light interacting with the substance is scattered by the substance resulting in that the scattered light is affected by the substance. Such scattering from a substance can either be elastic or in-elastic. In elastic scattering the photons of scattered light exhibit the same energy as the photons impinging on the substance at hand. In in-elastic scattering the photons of scattered light exhibit a different energy as compared to the photons impinging on the substance at hand. In-elastically scattered photons therefore either gain or lose energy.

Both elastically and in-elastically scattered photons may be used in spectroscopic analyses of substances. When looking at elastically scattered photons certain properties, such as color, of the substance may be determined. However, when it comes to determining a certain substance more sophisticated spectroscopic techniques also relying on in-elastically scattered photons are generally required.

Raman spectroscopy is a spectroscopic technique relying on inelastic scattering of photons, known as Raman scattering. In Raman spectroscopy a source of monochromatic light, usually from a laser, is used. The light source may emit light in the visible, near infrared, IR, or near ultraviolet, UV, range, although X-rays can also be used. The laser light interacts with molecular vibrations, phonons or other excitations in the molecular system, resulting in that the energy of the laser photons being shifted up or down in the in-elastically scattered light thereof. The shift in energy gives information about the vibrational modes in the molecular system at hand. In other words, in-elastically light scattered from the molecules of the substance at hand gives rise to a vibrational spectrum that includes of a series of lines or peaks constituting a molecular "fingerprint" for the substance. Hence a substance or material will give rise to a unique Raman spectrum, i.e. its "fingerprint". The unique Raman spectrum makes Raman spectroscopy suitable for identifying or determining substances or materials. In many fields of technology Raman spectroscopy is a well-established spectroscopic technique for rapid identifications of substances and chemicals with high degree of accuracy.

A typical Raman spectrum of a substance shows the shift of Raman wavelengths relative to elastically scattered light, typically referred to as Rayleigh-scattered light. The Rayleigh-scattered light has the same wavelength as the incident light of the light source whereas the Raman wavelengths are shifted up or down relative to the Rayleigh-scattered light. The vertical axis of a Raman spectrum typically represents the intensity of the Raman wavelengths and yields the concentration of the chemical components of the sample or substance, whereas the horizontal axis of a Raman spectrum typically represents the wavelength shift in relation to the Rayleigh light.

The light from Raman scattering is typically associated with weak intensities and may be difficult to observe without intense monochromatic excitation and a sensitive detector. Typically, 1 out of $10^6$-$10^9$ photons scattered by a sample is a photon relating to a Raman wavelength. However, modern technical development of lasers, detectors, and optical components as well as continued miniaturization of electronic components have made it possible to produce fast and reliable portable Raman instruments which are suitable to use under field conditions.

Typically, a recorded Raman spectrum exhibits a plurality of intensity peaks characterizing a sample to be identified, i.e. the "fingerprint" of the sample. While this is true for most organic and some inorganic samples, there are exceptions for, e.g. molecules having certain symmetries. Such exceptional substances/molecules may yield a peak having an intensity dominating the intensity over remaining peaks in the corresponding Raman spectrum of the substance. This may thereby obscure identification of the substance, as the signal to noise ratio for smaller peaks is relatively small and sometimes difficult to distinguish. Hence, there is a need for an approach being capable of identifying samples having a large variation between characterizing Raman peaks. In other words, there is a need for an approach being capable of identifying samples having a large dynamic range between characterizing Raman peaks.

US 2020/0064270 A1 discloses a method for identifying minerals and other materials. The method illuminates a mineral with monochromatic light for an illumination duration and collects scattered light using a Raman spectrometer detector. An aggregated or average Raman spectrum data is determined. True Raman spectrum data is determined by subtracting a blank spectrum. The true Raman spectrum data is compared to reference spectrums to identify the mineral or material.

AXELSSON M ET AL: "Detection and classification of explosive substances in multi-spectral image sequences using linear subspace matching", ICASSP, IEEE INTERNATIONAL CONFERENCE ON ACOUSTICS, SPEECH AND SIGNAL PROCESSING-PROCEEDINGS 1999 IEEE, IEEE (2013-05-26), XP032508468, ISSN: 1520-6149 discloses a method for detection and classification of explosive substances in multi-spectral image sequences from imaging Raman spectroscopy using linear subspace matching. The disclosed approach uses limited spectral information and is computationally efficient. Thus, the approach enables fast screening of interesting spectra areas.

SUMMARY

It is an object to mitigate, alleviate or eliminate one or more of the above-identified deficiencies in the art and disadvantages singly or in any combination and at least partly solve the above-mentioned problem.

In view of the above, it is an object of the present invention to provide an improved method for identifying a set of candidate substances of a sample and an improved Raman spectroscopy device.

Another object is to provide such a method and Raman spectroscopy device which improves identification of samples having a large dynamic range between intensities of characterizing Raman peaks.

Another object is to provide such a method and Raman spectroscopy device which improves identification of different samples having similar Raman spectra.

To achieve at least one of the above objects and also other objects that will be evident from the following description, a method for identifying a set of candidate substances of a sample having the features defined in claim 1 is provided according to the present inventive concept. A Raman spectroscopy device is provided according to claim 8. A non-transitory computer-readable storage relating to the method for identifying a set of candidate substances of a sample is provided according to claim 7. Preferred variations to the inventive concept will be evident from the dependent claims.

According to a first aspect there is provided a method for identifying a set of candidate substances of a sample using a Raman spectroscopy device comprising a spectrometer, the method comprising setting an exposure time of the spectrometer, recording a Raman spectrum of the sample using the spectrometer being set to the exposure time, identifying a Raman peak having a largest intensity of at least one Raman peak of the Raman spectrum, determining a Raman shift of the identified Raman peak in the Raman spectrum, comparing the Raman shift against a database comprising entries correlating substances with information associated with Raman shifts of the substances, thereby identifying a set of candidate substances, wherein each candidate substance in the set of candidate substances has a Raman shift corresponding to the Raman shift, and reducing the set of candidate substances by setting a further exposure time of the spectrometer, the further exposure time being longer than the exposure time, recording a further Raman spectrum of the sample using the spectrometer being set to the further exposure time, identifying, while excluding wavelengths associated with all previously identified Raman peaks, a further Raman peak in the further Raman spectrum, the further Raman peak having a largest intensity of at least one Raman peak in the further Raman spectrum, determining a further Raman shift of the further Raman peak in the further Raman spectrum, comparing the further Raman shift against entries of the database corresponding to the candidate set of substances, thereby identifying a subset of candidate substances, wherein each candidate substance in the subset of candidate substances has a Raman shift corresponding to the further Raman shift, and excluding, from the set of candidate substances, candidate substances not forming part of the subset of candidate substances, thereby reducing the set of candidate substances.

Hereby an improved method for identifying a set of candidate substances of a sample is provided. Within the context of this disclosure, a "Raman shift of a Raman peak" should be construed as a wavelength difference between an excitation wavelength, i.e. the wavelength of Rayleigh-scattered light, and a wavelength of the Raman peak.

The words "substance" and "sample" are frequently used throughout this text. "Substance" is commonly known as a pure form of matter containing only one type of atoms or molecules. When referring to a "sample", an amount of matter, possibly comprising a compound of substances, is considered. A sample may consist of a single substance, thereby equating the words "sample" and "substance". Generally, a sample may comprise a plurality of different substances. The words sample and substance may however occasionally be used interchangeably, which should not confuse the skilled person.

The method may be a computer implemented method.

The "exposure time", "Raman spectrum", etc. may throughout this disclosure occasionally be denoted the "first exposure time"/"initial exposure time", "first Raman spectrum"/"initial Raman spectrum" in order to emphasize that these quantities refer to a first/initial recording. This since this disclosure refers to two or more exposure times, Raman spectra, etc.

Many types of light may be present upon detection of Raman signals. Herein, light of interest is preferably light scattered from the sample originating from a light source of the Raman spectroscopy device. Hence, any background light, noise, fluorescence contribution, or the like, may obscure detection of Raman signals. These types of light may, to a certain extent, be filtered out from scattered light of the sample before reaching a sensor of the Raman spectroscopy device. Remaining light reaching the sensor may be light corresponding to the Stokes band. Absolute wavelengths/wavenumbers of the so-called Stokes band depends on the wavelength of the light source of the Raman spectroscopy device, mentioned above in connection with the "Raman shift of a Raman peak".

The "exposure time" within this disclosure refers to a time period during which light, scattered from the sample, hits a sensor of the Raman spectroscopy device, i.e. corresponding to an exposure time of a normal digital camera.

The method may facilitate identifying a substance having a Raman peak having an intensity being significantly larger than remaining Raman peaks in the Raman spectrum of the sample.

By way of example, exposure times in question may lie in the range 20-32000 ms. Recordings of a Raman spectra for samples comprising symmetric molecules resulting in relatively strong Raman signals may typically use exposure times in the range 50-2000 ms. "Symmetric molecules" generally, and also herein, typically refers to the geometric space configuration of atoms of the molecule. Excitation of certain vibrational modes (by, e.g. a laser) of a molecule may affect the electron cloud of the molecule such that the molecules' interaction with light, e.g. reflectance or absorbance of photon energy, is affected. For a molecule having a certain symmetry, the symmetry property of the molecule may imply that specific vibrational modes of the molecule render a corresponding Raman spectrum having characterizing Raman peaks reflecting these specific vibrational modes. Another example is recording of substances comprising less symmetric molecules resulting in weaker Raman signals. Here exposure times may lie in the range 5000-15000 ms. The skilled person appreciates that any adequate exposure time may be used without departing from the scope of the claims. Hence, a sample may be adequately identified despite being a sample comprising symmetric molecules. Further, this may be done in a relatively speaking short time.

In practice, the wavelengths used in the Raman spectrum belong to the Stokes band of the Raman spectrum. In practice, however, there are always corresponding anti-Stokes peaks of a sample. At room temperature the anti-Stokes peaks are relatively small relative to the corresponding Stokes peaks, and are thereby usually not considered when analyzing a sample. However, it is appreciated that, within the scope of the claims, anti-Stokes peaks of a sample may be used.

The act of reducing the set of candidate substances may be repeated until the set of candidate substances is a single candidate substance, which is advantageous in that the sample may be identified. In other words, a substance or material of the sample may be identified.

The exposure time may be set such that the first Raman spectrum is within a dynamical range of an optical sensor of the spectrometer.

Should a Raman spectrum be recorded with an exposure time corresponding to pixels being overexposed (that is, portions of the Raman spectrum being outside the dynamical range of the optical sensor), "blooming" or other unbeneficial effects associated with overexposed pixels may be present. This may result in a less precise Raman shift of a Raman peak in the Raman spectrum. Hence, saturation of pixels of the sensor is preferably prevented in connection with the first Raman spectrum. The Raman shift of a Raman peak having the largest intensity in the Raman spectrum of a sample may thereby be determined with a relatively high accuracy.

The further exposure time may be set such that the intensity of at least one Raman peak of the further Raman spectrum exceeds a dynamical range of an optical sensor of the spectrometer.

Hence, less intense Raman peaks may be pronounced or appear which Raman peaks having a larger signal-to-noise ratio, SNR, compared to the same Raman peaks when using shorter exposure times. In other words, less intense Raman peaks may become detectable when using longer exposure times.

The Raman spectroscopy device may be a handheld Raman

Hence, flexibility is facilitated such that identification or matching of substances under field conditions may be possible.

The method may further comprise forming a compound Raman spectrum based on identified Raman peaks.

The compound Raman spectrum may be a spectrum comprising a first and a second Raman spectrum, captured using a first exposure time and a second exposure time, respectively, the first exposure time being shorter than the second exposure time. For instance, the compound Raman spectrum may comprise unsaturated Raman peaks of the second Raman spectrum while saturated Raman peaks may be replaced with a corresponding unsaturated Raman peak of the first Raman spectrum. Using the compound Raman spectrum may facilitate a direct identification of the substance against a database. This may be advantageous since all identified Raman peaks are clearly visible in the compound spectrum, and, to a certain extent, mutually 5 comparable for a user. This may facilitate recognition of a sample for the user.

According to a second aspect there is provided a Raman spectroscopy device comprising a spectrometer, circuitry configured to execute an exposure time setting function configured to set an exposure time of the spectrometer, a recording function configured to record a Raman spectrum of the sample using the spectrometer being set to the exposure time, a Raman peak identifying function configured to identify a Raman peak having a largest intensity of at least one Raman peak of the Raman spectrum, a Raman shift determining function configured to identify a Raman shift of the identified Raman peak in the Raman spectrum, a Raman shift comparing function configured to compare the Raman shift against a database comprising entries correlating substances with information associated with Raman shifts of the substances, thereby identifying a set of candidate substances, wherein each candidate substance in the set of candidate substances has a Raman shift corresponding to the Raman shift, wherein the circuitry is further configured to reduce the set of candidate substances by executing a further exposure time setting function configured to set a further exposure time of the Raman spectroscopy device, the further exposure time being longer than the exposure time, a further Raman spectrum recording function configured to record a further Raman spectrum of the sample using the Raman spectroscopy device being set to the further exposure time, an identifying function configured to identify, while excluding wavelengths associated with identified Raman peaks, a further Raman peak in the further Raman spectrum, the further Raman peak having a largest intensity of Raman peaks in the further Raman spectrum, a further Raman shift determining function configured to determine a further Raman shift of the further Raman peak in the further Raman spectrum, a comparing function configured to compare the further Raman shift against entries of the database corresponding to the candidate set of substances, thereby identifying a subset of candidate substances, wherein each candidate substance in the subset of candidate substances has a Raman shift corresponding to the further Raman shift, an excluding function configured to exclude, from the set of candidate substances, candidate substances not forming part of the subset of candidate substances, thereby reducing the set of candidate substances.

The above-mentioned features and advantages of the first aspect, when applicable, apply to this third aspect as well. In order to avoid undue repetition, reference is made to the above.

The circuitry may be configured to repeatedly reduce the set of candidate substances until the set of candidate substances is a single candidate substance.

The exposure time setting function may be configured to set the exposure time such that the first Raman spectrum is within a dynamical range of an optical sensor of the spectrometer.

The further exposure time setting function may be configured to set the further exposure time such that the intensity of at least one Raman peak of the further Raman spectrum exceeds a dynamical range of an optical sensor of the spectrometer.

The Raman spectroscopy device may be a handheld Raman spectroscopy device.

The circuitry may further be configured to execute:

a compound Raman spectrum forming function configured to form a compound Raman spectrum based on identified Raman peaks.

According to a third aspect there is provided a computer program. The computer program comprising program code portions to cause the circuitry of the Raman spectroscopy device of the second aspect to execute the method of the first aspect.

The above-mentioned features and advantages of the first aspect, when applicable, apply to this third aspect as well. In order to avoid undue repetition, reference is made to the above.

According to a fourth aspect there is provided a non-transitory computer-readable storage medium. The non-transitory computer-readable storage medium having stored thereon the computer program of the third aspect. In other words, the non-transitory computer-readable storage medium having stored thereon program code portions or instructions for implementing the method according to the first aspect, when executed in the circuitry of the Raman spectroscopy device according to the second aspect.

The above-mentioned features and advantages of the first aspect, when applicable, apply to this fourth aspect as well. In order to avoid undue repetition, reference is made to the above.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or acts of the methods described as such device and method may vary. It is also to be understood that the terminology used herein is for purpose of describing particular embodiments only and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above and other aspects of the present invention will now be described in more detail, with reference to appended figures. The figures should not be considered limiting; instead, they are used for explaining and understanding. Like reference numerals refer to like elements throughout.

DETAILED DESCRIPTION

The present inventive concept will now be described more fully hereinafter with reference to the accompanying drawings, in which currently preferred variants of the inventive concept are shown. This inventive concept may, however, be implemented in many different forms and should not be construed as limited to the variants set forth herein; rather, these variants are provided for thoroughness and completeness, and to fully convey the scope of the present inventive concept to the skilled person.

Figure 1A:
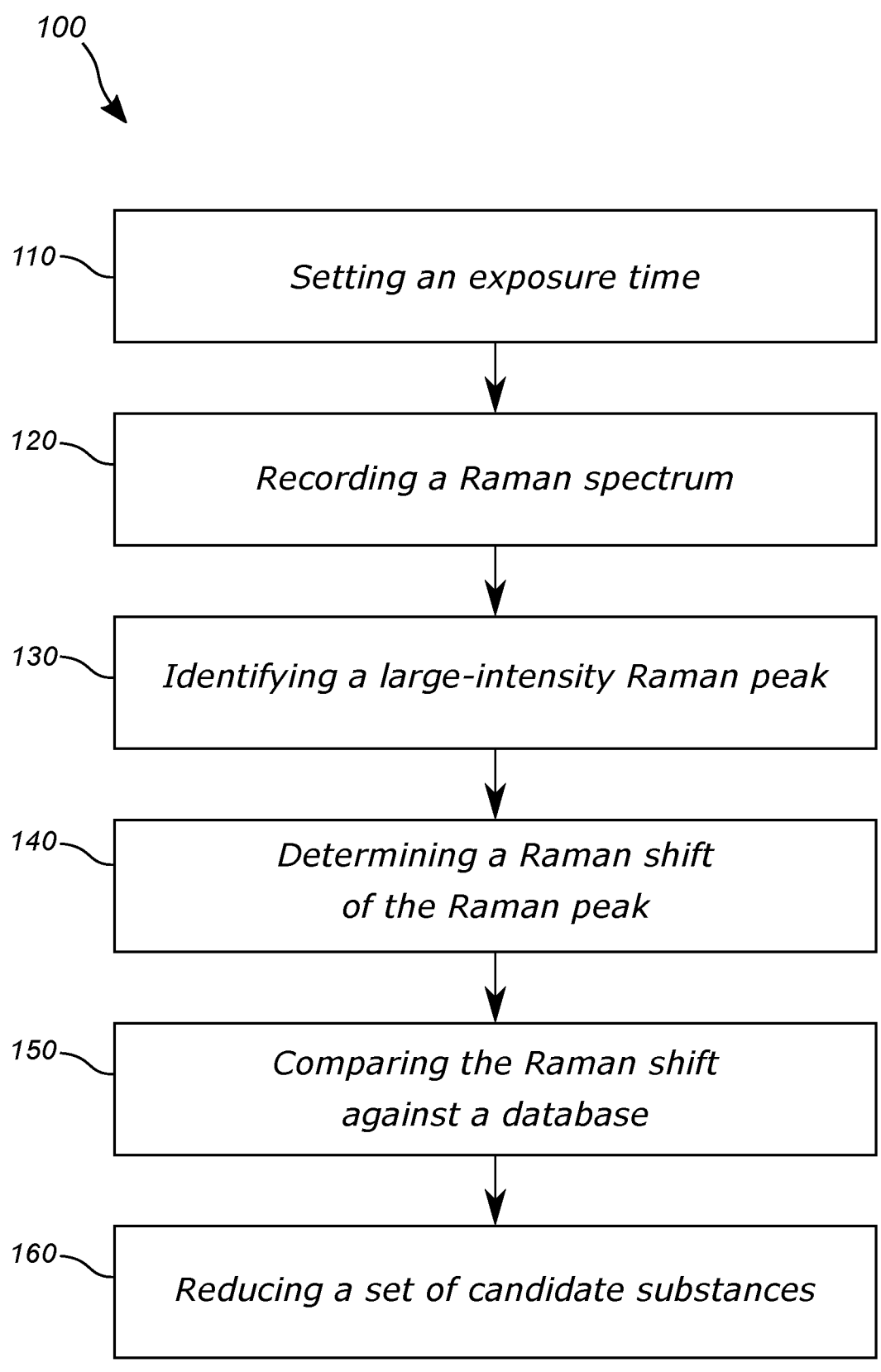
FIGS. 1A and 1B jointly show a flowchart for a method for identifying a set of candidate substances of a sample using a Raman spectroscopy device.
Figure 1B:
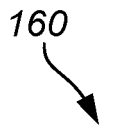

In connection with FIGS. 1A-B there is shown a flowchart for a method 100 for identifying a set of candidate substances of a sample using a Raman spectroscopy device. The "sample" will henceforth refer to a substance or material to be identified, if not stated otherwise. Before continuing with the description of the method 100, a general overview of the Raman spectroscopy device 200 is briefly discussed with reference to FIG. 2.

Figure 2:
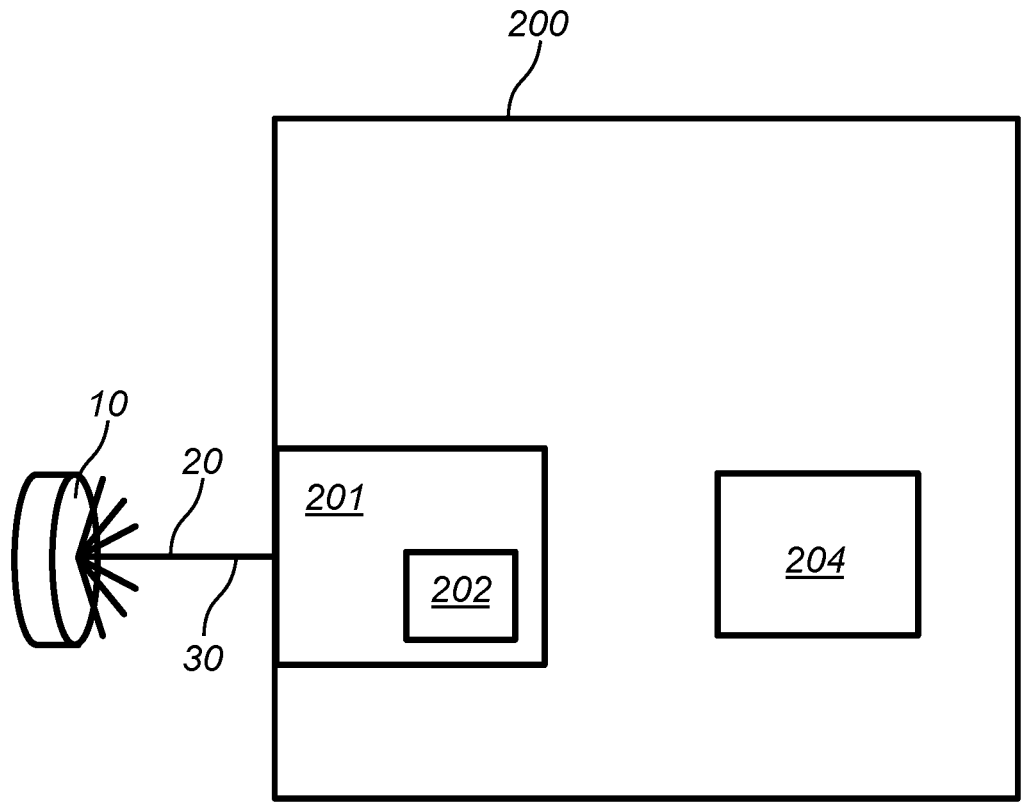
FIG. 2 shows a block diagram of a Raman spectroscopy device.

In connection with FIG. 2 there is shown a block diagram of the Raman spectroscopy device 200.

The Raman spectroscopy device may be a handheld Raman spectroscopy device 200. The Raman spectroscopy device 200 may thereby be suitable for use under field conditions. The Raman spectroscopy device may thus be designed such that it is suitable to be hand carried and hand operated by an operator. Hence the Raman spectroscopy device 200 typically includes its own power source and may consequently be used without any external power. Further, the Raman spectroscopy device 200 is typically self-sufficient in the sense that the Raman spectroscopy device 200 may operate on its own without requiring a connection to any external entity or data source. Hence, the Raman spectroscopy device 200 may function in absence of wireless communication means, i.e. without exploiting a cellular network, cloud-based services, or the like. However, the present disclosure may advantageously be used in non-handheld Raman spectroscopy systems, such as Raman spectroscopy systems used in laboratories. Moreover, the Raman spectroscopy device 200 may be connected to, e.g. the internet to exchange data such as measurement data or data related to firmware updates with external entities.

The Raman spectroscopy device 200 comprises an optical arrangement 201 including a spectrometer 202. The depicted spectroscopy device 200 is designed to analyze inelastically scattered light 20 from a sample 10. In other words, the depicted Raman spectroscopy device 200 is designed to analyze a Raman contribution in light 20 scattered from the sample 10. Hence, the depicted Raman spectroscopy device 200 includes a spectrometer 202 which may analyze the Raman contribution in light 20 scattered form the sample 10. The sample 10 may for instance be a solid object, a powder, or a liquid to give a few non-limiting examples.

Generally speaking, the spectroscopy device 200 includes an optical arrangement 201 and circuitry 204. The circuitry 204 of FIG. 1 will be further described in connection with FIG. 3 below. The optical arrangement 201 and the circuitry 204 are connected to each other such that the respective components may communicate and cooperate in order to analyze light 20 scattered from the sample 10.

The depicted Raman spectroscopy device 200 is configured to emit light 30 towards the sample 10. The emitted light 30 thus interacts with the sample 10 which scatters the light 30. The light 30 thus interacts with the sample 10 which scatters the light 30 elastically and in-elastically, hence resulting in scattered light 20. The scattered light 20 is receivable by the optical arrangement 201 of the depicted spectroscopy device 200. The optical arrangement 201 of the depicted spectroscopy device 200 is consequently configured to emit light 30 and receive and analyze scattered light 20.

A light source of the optical arrangement 201 of the Raman spectroscopy device 200 is thereby configured to illuminate the sample 10 via a lens of the optical arrangement 201. The light source may be a laser that may generate a laser beam 30 having any adequate wavelength. Adequate wavelengths in connection to Raman spectroscopy are wavelengths capable of generating relatively large inelastic scattering events upon interaction between the laser beam 30 and the sample 10 such that a useful Raman signal may be detected by the optical arrangement 201. A wavelength of a laser light source may have a nominal wavelength of 785 nm.

With respect to the brief and general above description of the Raman spectroscopy device 200, the method 100 in connection with FIGS. 1A and 1B will now be described.

The method 100 comprises setting 110 an exposure time of the spectrometer 202. The exposure time may be automatically set. For such an automatically setting of exposure time a plurality of relatively short light pulses may be emitted by the laser for interaction with the sample 10. From recorded Raman intensities in connection thereto calculation of an exposure time may be done for usage of, e.g. 80% of the dynamical range of the sensor. A range of exposure times are possible. In the present context, a short exposure time may be of the order of 10 milliseconds, ms. Conversely, a long exposure time may be of the order of 10 seconds, s. As already set out above, applied to the present Raman spectroscopy device, exposure times in question may lie in the range 20-32000 ms. Recording of samples comprising highly symmetric molecules resulting in relatively strong Raman signals may typically use exposure times in the range 50-2000 ms. Recording of samples comprising less symmetric molecules resulting in weaker Raman signals may use exposure times in the range 5000-15000 ms. The skilled person appreciates that any adequate exposure time may be used without departing from the scope of the claims.

The method 100 further comprises recording 120 a Raman spectrum of the sample using the spectrometer 202 being set to the exposure time.

The method 100 further comprises identifying 130 a Raman peak having a largest intensity of at least one Raman peak of the Raman spectrum. For certain samples comprising molecules having certain symmetry properties, the Raman peak having the largest intensity may, by way of example, be at least one order of magnitude larger than any other peak in the wavelength band under consideration. An example of such a molecule may be a Benzene molecule, having a large Raman peak at approximately 1000 cm$^{-1}$, whereas remaining Raman peaks are significantly smaller. Herein, and generally within the field of spectroscopy, the unit cm$^{-1}$, i.e. the unit for the quantity wavenumber, refers to the inverse wavelength of light. Hence the previous Raman peak, 1000 cm$^{-1}$, corresponds to the wavelength $\frac{1}{1000}$ cm=10 μm. Typical wavelengths considered in Raman spectroscopy may lie in the range 4-25 μm, i.e. in the mid-IR spectrum. Hence, these typical wavelengths may be relatively large compared to the (785 nm) laser typically used. For practical reasons, a Raman spectrum may be represented in an intensity versus wavelength graph by transforming the wavelength axis according to the equation $$\lambda[nm] = \cfrac{1}{\cfrac{1}{\lambda_{ex}[nm]} - \cfrac{\text{Raman shift}}{10^7}}$$

In the present example, considering the 1000 cm$^{-1}$ peak (Raman shift=1000 in the equation) and the 785 nm laser wavelength ($\lambda_{ex}$=785 in the equation), the 1000 cm$^{-1}$ peak is located approximately at the wavelength 850 nm in the corresponding Raman spectrum. Again, the wavelengths are typically converted to cm$^{-1}$. It is appreciated that a Raman spectrum may be represented in many ways in an intensity versus wavelength graph. Hence, below, the words wavenumber and wavelength may be used interchangeably, which should not confuse the skilled person within the present context.

The method 100 further comprises determining 140 a Raman shift of the identified Raman peak in the Raman spectrum. Per the above, a "Raman shift of a Raman peak" refers to a wavelength difference between an excitation wavelength and a wavelength of the laser. Most of the light, scattered from the sample towards the sensor, includes elastically scattered light, i.e. having the wavelength of the laser. Should this light hit the sensor a large peak would be present at the laser wavelength in a spectrum that also includes a wavelength interval extending above and below the wavelength of the laser. This light is preferably filtered out from the scattered light by a lowpass filter before reaching the sensor. However, in practice, a small fraction originating from Rayleigh scattering will still typically reach the sensor. The laser wavelength in such a spectrum is typically referred to as the Rayleigh line. Herein, Stokes scattering, i.e. wavelengths corresponding to a photon energy being lower (i.e., longer wavelengths) than the photon energy of the laser, is considered. Wavelengths of scattered light 20 corresponding to the anti-Stokes band may, as described above, be filtered out before reaching the sensor. It is however appreciated that the method applies equally well to anti-Stokes scattering, i.e. wavelengths corresponding to a photon energy being higher than the photon energy of the laser. However, anti-Stokes scattering is in general associated with intensities being relatively small compared to corresponding Stokes scattering events, hence being more difficult to detect and draw conclusions from.

The method 100 further comprises comparing 150 the Raman shift against a database comprising entries correlating substances with information associated with Raman shifts of the substances, thereby identifying a set of candidate substances, wherein each candidate substance in the set of candidate substances has a Raman shift corresponding to the Raman shift. The database preferably comprises a relatively large number of substances, each substance being associated with certain properties, such as wavelengths of characterizing Raman peaks of the substance, relative intensities between Raman peaks, etc. A substance in the database is thereby associated with a "fingerprint" for possible matching with a substance for which the Raman spectroscopy device has recorded a Raman spectrum. Should only a single peak be present in the recorded Raman spectrum, the candidate list of substances may be relatively extensive, which may obscure a proper identification of the substance. The comparison 150 per the above, and, subsequently, identifying the set of candidate substances may be done by an ordinary procedure within the art. As a fictious example, a sample 10 to be identified, exhibits two detected Raman peaks at 800 cm$^{-1}$ and 1200 cm$^{-1}$. The 800 cm$^{-1}$ is five times as high as the 1200 cm$^{-1}$ peak. A specific substance of the set of substances in the database has two peaks; one at 790 cm$^{-1}$ and one at 1230 cm$^{-1}$, where the 790 cm$^{-1}$ is four times as high as the 1230 cm$^{-1}$ peak. In this example, the sample may be deemed to be the specific substance, since the above data matches "close enough". Hence, the identification may include threshold probabilities and error margins upon identification of a substance of a sample, as is normally the case within the art.

The method further comprises reducing 160 the set of candidate substances. The act of reducing 160 the set of candidate substances is done by the method steps 161-166 shown in FIG. 1B as described below.

The act of reducing 160 the set of candidate substances comprises setting 161 a further exposure time of the spectrometer, the further exposure time being longer than the exposure time.

The act of reducing 160 the set of candidate substances further comprises recording 162 a further Raman spectrum of the sample using the spectrometer being set to the further exposure time.

Using a longer exposure time may thereby reveal additional Raman peaks. The further exposure time may render the already identified (by step 120 above) Raman peak having the largest intensity overexposed. Hence, saturation of the sensor, i.e. "blooming", may be present when recording the same peak using the further exposure time. However, in this step 161, remaining Raman peaks are the Raman peaks taken in consideration, further appreciated below.

The act of reducing 160 the set of candidate substances further comprises identifying 163, while excluding wavelengths associated with all previously identified 120 Raman peaks, a further Raman peak in the further Raman spectrum, the further Raman peak having a largest intensity of at least one Raman peak in the further Raman spectrum. Hence, this is analogous to the identification 120 above.

The act of reducing 160 the set of candidate substances further comprises determining 164 a further Raman shift of the further Raman peak in the further Raman spectrum.

The act of reducing 160 the set of candidate substances further comprises comparing 165 the further Raman shift against entries of the database corresponding to the candidate set of substances, thereby identifying a subset of candidate substances, wherein each candidate substance in the subset of candidate substances has a Raman shift corresponding to the further Raman shift.

The act of reducing 160 the set of candidate substances further comprises excluding 166, from the set of candidate substances, candidate substances not forming part of the subset of candidate substances, thereby reducing the set of candidate substances. Hence, an updated set of candidate substances takes the place of a previous set of candidate substances, determined by the steps 110-150 above. In the event of the updated set of candidate substances comprises entries identical to the previous set of candidate substances, the act of reducing 160 the set of substances may be repeated using a longer exposure time.

The act of reducing 160 the set of candidate substances may be repeated until the set of candidate substances is a single candidate substance.

The exposure time may be set such that the first Raman spectrum is within a dynamical range of an optical sensor of the spectrometer. The optical sensor is a sensor for detecting electromagnetic waves, i.e. light. The light may have wavelengths within the visible spectrum, i.e. approximately in the range 400-700 nm. However, the optical sensor may further be configured to detect ultraviolet, UV, or infrared, IR, light, as is normal for optical sensors within Raman spectroscopy. For instance, the previously mentioned pronounced Raman peak of benzene at 1000 cm$^{-1}$ corresponds to light in the IR spectrum. The Raman shift of the Raman peak thereby refers to a wavelength/wavenumber difference between an excitation wavelength/wavenumber and a wavelength of a light source of the Raman spectroscopy device. By way of example, the light source of the Raman spectroscopy device 200 may be a laser emitting a (coherent) laser beam having a wavelength of 785 nm. The optical sensor may be a linear charge-coupled device, CCD. A linear CCD may be a light-sensitive sensor having few pixels, or even a single pixel, in a first dimension, while having a large number of pixels in a dimension perpendicular to the first dimension. For instance, the linear CCD may have 1 pixel in the first dimension and 2048 pixels in the dimension perpendicular to the first dimension. In other words, the CCD may be a liner CCD. Alternatively, the optical sensor may be a complementary metal-oxide-semiconductor, CMOS, sensor. Alternatively, the optical sensor may be a matrix-type CCD or CMOS sensor. The Raman spectrum being within the dynamical range of the optical sensor refers to sensor detection of photons by the optical sensor such that no pixel of the optical sensor becomes saturated. As appreciated by the skilled person, "pixel" is herein to be interpreted widely. For a line CCD, a pixel may refer to a wavelength/wavenumber interval for which detected photons are counted. More generally, a pixel has its normal meaning in that being a discrete light sensitive element of the sensor, similar to ordinary digital imaging/photography.

The further exposure time may be set such that the intensity of at least one Raman peak of the further Raman spectrum exceeds a dynamical range of an optical sensor of the spectrometer. As described above, the further exposure time is longer than the exposure time used to record the first Raman spectrum. Hence, for the further exposure time, at least one pixel of the optical sensor may become saturated when recording the further Raman spectrum. This is conceptually equivalent to overexposure in normal digital photography. Hence, fainter signals, i.e. less intense Raman peaks, in the Raman spectrum may be more pronounced or may be revealed when using the further exposure time.

The method 100 may further comprise forming a compound Raman spectrum based on identified Raman peaks. Hence, the compound Raman spectrum may comprise at least two Raman spectra, where each Raman spectrum is recorded using different exposure times. Overexposed portions of respective spectrum may be subtracted or replaced by corresponding not overexposed portions in another spectrum. Hence, a high dynamical range, HDR, spectrum may be formed.

The method 100 may be implemented in computer program comprising program code portions to cause the circuitry 204 of the Raman spectroscopy device 200 to execute the method 100.

The computer program may be stored on a non-transitory computer-readable storage medium.

The method 100 may be implemented on a non-transitory computer-readable storage medium having stored thereon program code portions when executed on a device having processing capabilities.

Figure 3:
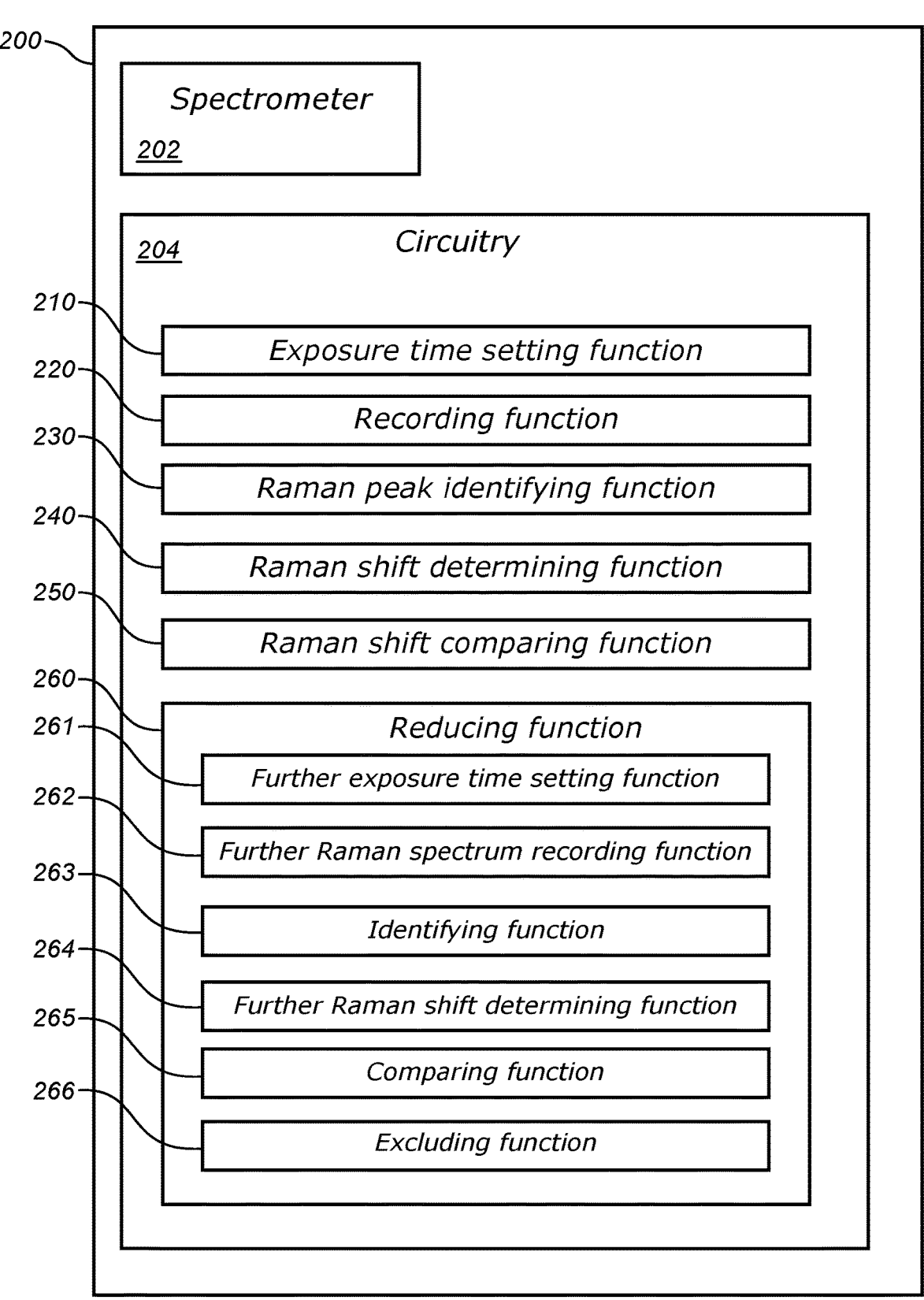
FIG. 3 shows block diagram of a Raman spectroscopy device with emphasis on a circuitry therein.

In connection with FIG. 3, there is shown, highly schematically, a Raman spectroscopy device 200. The method 100 may be implemented on the Raman spectroscopy device 200. Hence, the description in connection with the method 100 above, when applicable, also applies to the description of the Raman spectroscopy device 200 below. The Raman spectroscopy device comprises a spectrometer 202. The Raman spectroscopy device 200 further comprises circuitry 204.

The circuitry 204 is configured to carry out overall control of functions and operations of the Raman spectroscopy device 200. The circuitry 204 may include a processor, such as a central processing unit (CPU), microcontroller, or microprocessor. The processor is configured to execute program code stored in the circuitry 204 to carry out functions and operations of the Raman spectroscopy device 200.

Executable functions, further described below, may be stored on a memory. The memory may be one or more of a buffer, a flash memory, a hard drive, a removable media, a volatile memory, a non-volatile memory, a random access memory (RAM), or other suitable devices. In a typical arrangement, the memory may include a non-volatile memory for long term data storage and a volatile memory that functions as system memory for the circuitry 204. The memory may exchange data with the circuitry over a data bus. Accompanying control lines and an address bus between the memory and the circuitry may be present.

Functions and operations of the circuitry 204 may be embodied in the form of executable logic routines, e.g., computer-code portions, software programs, etc., that are stored on a non-transitory computer readable medium, e.g., the memory, of the Raman spectroscopy device 200 and are executed by the circuitry 204 by, e.g., using the processor. The functions and operations of the Raman spectroscopy device 200 may be a stand-alone software application or form a part of a software application that carries out additional tasks related to the electronic device. The described functions and operations may be considering a method that the corresponding device is configured to carry out. Also, while the described functions and operations may be implemented in a software, such functionality may as well be carried out via dedicated hardware or firmware, or some combination of hardware, firmware and/or software.

The circuitry 204 is configured to execute an exposure time setting function 210 configured to set an exposure time of the spectrometer.

The circuitry 204 is further configured to execute a recording function 220 configured to record a Raman spectrum of the sample using the spectrometer being set to the exposure time.

The circuitry 204 is further configured to execute a Raman peak identifying function 230 configured to identify a Raman peak having a largest intensity of at least one Raman peak of the Raman spectrum.

The circuitry 204 is further configured to execute a Raman shift determining function 240 configured to identify a Raman shift of the identified Raman peak in the Raman spectrum.

The circuitry 204 is further configured to execute a Raman shift comparing function 250 configured to compare the Raman shift against a database comprising entries correlating substances with information associated with Raman shifts of the substances, thereby identifying a set of candidate substances, wherein each candidate substance in the set of candidate substances has a Raman shift corresponding to the Raman shift. The circuitry 204 is further configured to reduce the set of candidate substances. In FIG. 2 this is associated with a reducing function 260.

The reducing function 260 is configured to execute a further exposure time setting function 261 configured to set a further exposure time of the Raman spectroscopy device, the further exposure time being longer than the exposure time.

The reducing function 260 is further configured to execute a further Raman spectrum recording function 262 configured to record a further Raman spectrum of the sample using the Raman spectroscopy device being set to the further exposure time.

The reducing function 260 is further configured to execute an identifying function 263 configured to identify, while excluding wavelengths associated with identified Raman peaks, a further Raman peak in the further Raman spectrum, the further Raman peak having a largest intensity of Raman peaks in the further Raman spectrum.

The reducing function 260 is further configured to execute a further Raman shift determining function 264 configured to determine a further Raman shift of the further Raman peak in the further Raman spectrum The reducing function 260 is further configured to execute a comparing function 265 configured to compare the further Raman shift against entries of the database corresponding to the candidate set of substances, thereby identifying a subset of candidate substances, wherein each candidate substance in the subset of candidate substances has a Raman shift corresponding to the further Raman shift.

The reducing function 260 is further configured to execute an excluding function 266 configured to exclude, from the set of candidate substances, candidate substances not forming part of the subset of candidate substances, thereby reducing the set of candidate substances.

The circuitry 204 may further be configured to repeatedly reduce the set of candidate substances until the set of candidate substances is a single candidate substance.

The exposure time setting function 210 may further be configured to set the exposure time such that the first Raman spectrum is within a dynamical range of an optical sensor of the spectrometer.

The further exposure time setting function may further be configured to set the further exposure time such that the intensity of at least one Raman peak of the further Raman spectrum exceeds a dynamical range of an optical sensor of the spectrometer 202.

The Raman spectroscopy device may be a handheld Raman spectroscopy device.

The circuitry 204 may further be configured to execute a compound Raman spectrum forming function configured to form a compound Raman spectrum based on identified Raman peaks.

Figure 4A:
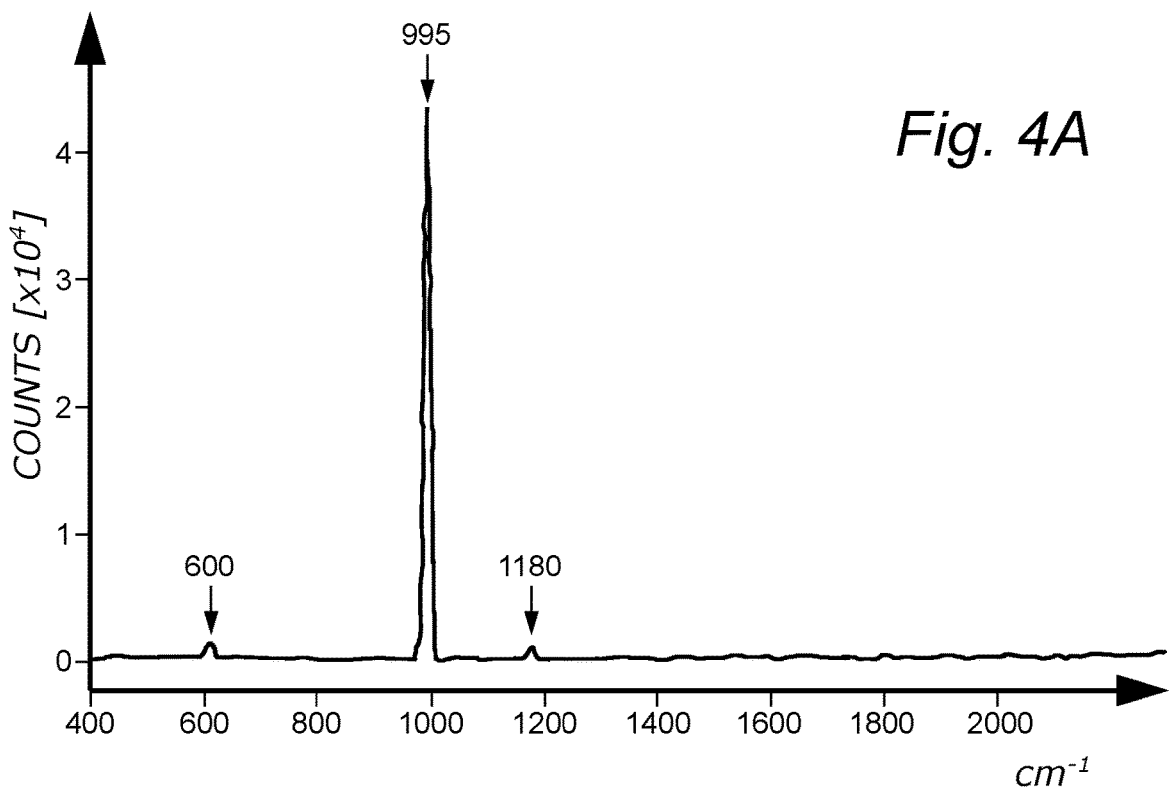
FIGS. 4A-B shows an example Raman spectrum recorded using two different exposure times.
Figure 4B:
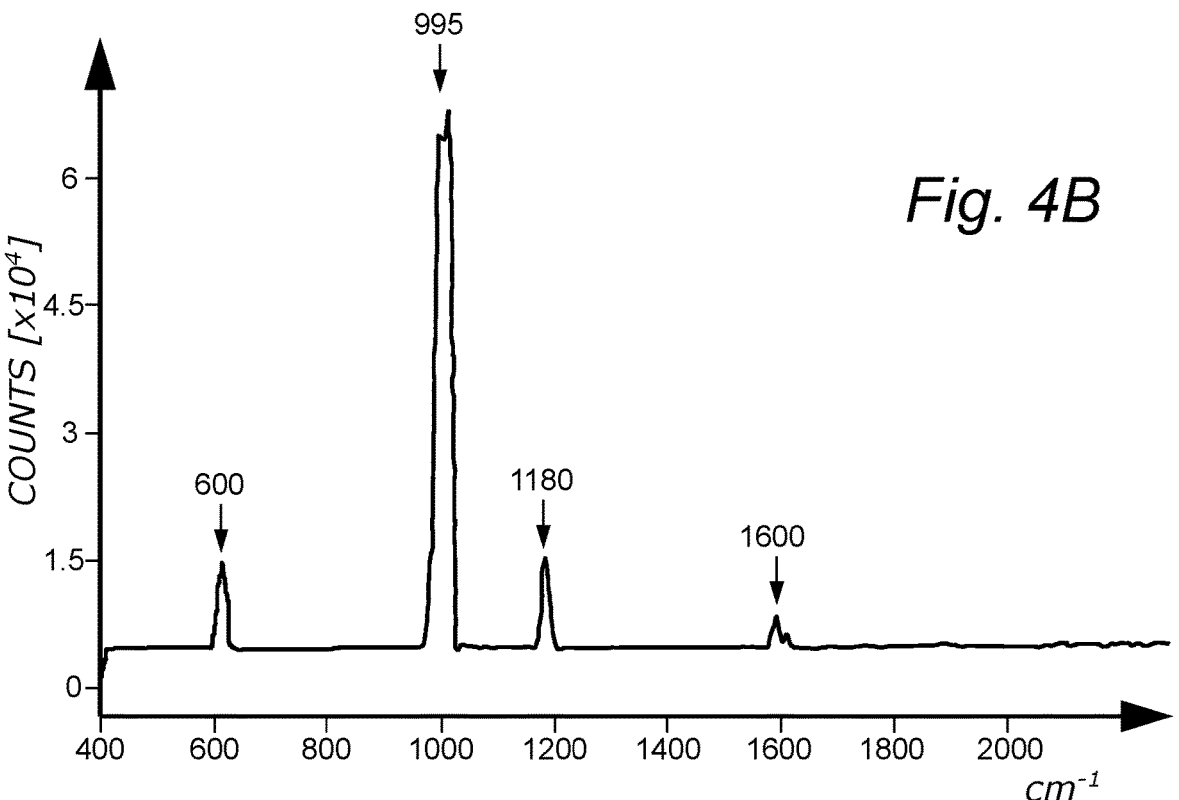

In connection with FIGS. 4A-B, there is shown an example Raman spectrum of benzene. This by using an excitation wavelength of 785 nm. In FIG. 4A there is shown a Raman spectrum being recorded using the first exposure time. The first exposure time in this specific example is set to 240 ms. The first exposure time is such that the pronounced 995 cm$^{-1}$ peak lies within the dynamical range of the optical sensor. Two smaller Raman peaks, at 600 and 1180 cm$^{-1}$, are visible but small relative to the larger 995 cm$^{-1}$ peak at this scale. The measurement of this spectrum may generate a set of candidate substances having a plurality of entries, i.e. including substances other than benzene, benzene isotopes, or the like. This set of candidate substances may be reduced by performing a measurement using a second exposure time being longer than the first exposure time, described above. The second exposure time in this specific example is set to 1240 ms, i.e. approximately five times longer than the first exposure time. A Raman spectrum of benzene recorded using such a longer exposure time is shown in FIG. 4B. Here, the 995 cm$^{-1}$ peak is saturated due to the longer exposure time. On the other hand, the smaller Raman peaks at 600 and 1180 cm$^{-1}$ appear more pronounced compared to the corresponding peaks in FIG. 3A. Further, the smaller peaks do normally have a larger SNR compared to the corresponding peaks for shorter exposure times. Hence, the wavelengths for the smaller peaks can be specified with a larger certainty than for shorter exposure times. This alone may reduce the number of substances in the set of candidate substances. A fourth Raman peak, at 1600 cm$^{-1}$, appears in FIG. 4B. A Raman peak corresponding to the fourth Raman peak is absent in FIG. 4A. Hence, four Raman peaks may be deemed to be detected in FIG. 4B. The wavelengths and possibly relative intensities of the Raman peaks may be sufficient to reduce the number of substances in the set of candidate substances to a single substance. Should there still be a plurality of substances in the set of candidate substances, an additional recording may be done, using an exposure time longer than the exposure time used to generate the Raman spectrum in FIG. 4B. More Raman peaks may thereby be distinguished, which may reduce the set of candidate substances to a single substance deemed to be a correctly identified substance, i.e. benzene.

Accordingly, and in summary, an approach for identifying a set of candidate substances of a sample has been exemplified above in a non-limited way, with emphasis of samples comprising molecules having at least one Raman peak being significantly larger than remaining Raman peaks in the spectrum. The approach records at least two Raman spectra using different exposure times for gradually decreasing the number of candidate substances that matches a Raman fingerprint against a database of the Raman spectroscopy device. More Raman spectra may be recorded using other exposure times such that a single candidate substance remains in the list of candidate substances, the single candidate substance being concluded to be a substance of the sample.

The person skilled in the art realizes that the present invention by no means is limited to the preferred embodiments described above. On the contrary, many modifications and variations are possible within the scope of the appended claims.

Additionally, variations to the disclosed embodiments can be understood and effected by the skilled person in practicing the claimed invention, from a study of the drawings, the disclosure, and the appended claims.

The invention claimed is:

1. A method for identifying a set of candidate substances of a sample using a Raman spectroscopy device-comprising a spectrometer, the method-comprising:
    setting an exposure time of the spectrometer,
    recording a Raman spectrum of the sample using the spectrometer being set to the exposure time,
    identifying a Raman peak having a largest intensity of at least one Raman peak of the Raman spectrum,
    determining a Raman shift of the identified Raman peak in the Raman spectrum,
    comparing the Raman shift against a database comprising entries correlating substances with information associated with Raman shifts of the substances, thereby identifying a set of candidate substances, wherein each candidate substance in the set of candidate substances has a Raman shift corresponding to the Raman shift, and
    reducing the set of candidate substances by:
        setting a further exposure time of the spectrometer, the further exposure time being longer than the exposure time,
        recording a further Raman spectrum of the sample using the spectrometer being set to the further exposure time,
        identifying, while excluding wavelengths associated with all previously identified Raman peaks, a further Raman peak in the further Raman spectrum, the further Raman peak having a largest intensity of at least one Raman peak in the further Raman spectrum,
        determining a further Raman shift of the further Raman peak in the further Raman spectrum,
        comparing the further Raman shift against entries of the database corresponding to the candidate set of substances, thereby identifying a subset of candidate substances, wherein each candidate substance in the subset of candidate substances has a Raman shift corresponding to the further Raman shift, and
        excluding, from the set of candidate substances, candidate substances not forming part of the subset of candidate substances, thereby reducing the set of candidate substances.

2. The method-according to claim 1, wherein the act of reducing the set of candidate substances is repeated until the set of candidate substances is a single candidate substance.

3. The method according to claim 1, wherein the exposure time is set such that the first Raman spectrum is within a dynamical range of an optical sensor of the spectrometer.

4. The method according to claim 1, wherein the further exposure time is set such that the intensity of at least one Raman peak of the further Raman spectrum exceeds a dynamical range of an optical sensor of the spectrometer.

5. The method according to claim 1, wherein the Raman spectroscopy device is a handheld Raman spectroscopy device.

6. The method according to claim 1, further comprising:
    forming a compound Raman spectrum based on identified Raman peaks.

7. A Raman spectroscopy device comprising:
    a spectrometer,
    circuitry configured to execute:
        an exposure time setting function configured to set an exposure time of the spectrometer,
        a recording function configured to record a Raman spectrum of a sample using the spectrometer being set to the exposure time, a Raman peak identifying function configured to iden-
tify a Raman peak having a largest intensity of at
least one Raman peak of the Raman spectrum,
a Raman shift determining function configured to iden-
tify a Raman shift of the identified Raman peak in the
Raman spectrum, and
a Raman shift comparing function configured to com-
pare the Raman shift against a database comprising
entries correlating substances with information asso-
ciated with Raman shifts of the substances, thereby
identifying a set of candidate substances, wherein
each candidate substance in the set of candidate
substances has a Raman shift corresponding to the
Raman shift,
wherein the circuitry is further configured to reduce the
set of candidate substances by executing:
a further exposure time setting function configured to
set a further exposure time of the Raman spec-
troscopy device, the further exposure time being
longer than the exposure time,
a further Raman spectrum recording function con-
figured to record a further Raman spectrum of the
sample using the Raman spectroscopy device
being set to the further exposure time,
an identifying function configured to identify, while
excluding wavelengths associated with identified
Raman peaks, a further Raman peak in the further
Raman spectrum, the further Raman peak having
a largest intensity of Raman peaks in the further
Raman spectrum,
a further Raman shift determining function config-
ured to determine a further Raman shift of the
further Raman peak in the further Raman spec-
trum,
a comparing function configured to compare the
further Raman shift against entries of the database
corresponding to the candidate set of substances,
thereby identifying a subset of candidate sub-
stances, wherein each candidate substance in the
subset of candidate substances has a Raman shift
corresponding to the further Raman shift, and
an excluding function configured to exclude, from
the set of candidate substances, candidate sub-
stances not forming part of the subset of candidate
substances, thereby reducing the set of candidate
substances.

8. The Raman spectroscopy device according to claim 7,
wherein the circuitry is configured to repeatedly reduce the
set of candidate substances until the set of candidate sub-
stances is a single candidate substance.

9. The Raman spectroscopy device according to claim 7,
wherein the exposure time setting function is configured to
set the exposure time such that the first Raman spectrum is
within a dynamical range of an optical sensor of the spec-
trometer.

10. The Raman spectroscopy device according to claim 7,
wherein the further exposure time setting function is con-
figured to set the further exposure time such that the inten-
sity of at least one Raman peak of the further Raman
spectrum exceeds a dynamical range of an optical sensor of
the spectrometer.

11. The Raman spectroscopy device according to claim 7,
wherein the Raman spectroscopy device is a handheld
Raman spectroscopy device.

12. The Raman spectroscopy device according to claim 7,
wherein the circuitry is further configured to execute:

a compound Raman spectrum forming function config-
ured to form a compound Raman spectrum based on
identified Raman peaks.

13. A computer program stored on a computer-readable
storage medium, the computer program comprising program
code portions configured to cause circuitry of a Raman
spectroscopy system to execute a method, comprising:
setting an exposure time of the spectrometer,
recording a Raman spectrum of the sample using the
spectrometer being set to the exposure time,
identifying a Raman peak having a largest intensity of at
least one Raman peak of the Raman spectrum,
determining a Raman shift of the identified Raman peak
in the Raman spectrum,
comparing the Raman shift against a database comprising
entries correlating substances with information associ-
ated with Raman shifts of the substances, thereby
identifying a set of candidate substances, wherein each
candidate substance in the set of candidate substances
has a Raman shift corresponding to the Raman shift,
and
reducing the set of candidate substances by:
setting a further exposure time of the spectrometer, the
further exposure time being longer than the exposure
time, recording a further Raman spectrum of the
sample using the spectrometer being set to the fur-
ther exposure time,
identifying, while excluding wavelengths associated with
all previously identified Raman peaks, a further Raman
peak in the further Raman spectrum, the further Raman
peak having a largest intensity of at least one Raman
peak in the further Raman spectrum,
determining a further Raman shift of the further Raman
peak in the further Raman spectrum, and
comparing the further Raman shift against entries of the
database corresponding to the candidate set of sub-
stances, thereby identifying a subset of candidate
substances, wherein each candidate substance in the
subset of candidate substances has a Raman shift
corresponding to the further Raman shift, and
excluding, from the set of candidate substances, candidate
substances not forming part of the subset of candidate
substances, thereby reducing the set of candidate sub-
stances.

14. The computer program according to claim 13, wherein
the act of reducing the set of candidate substances is
repeated until the set of candidate substances is a single
candidate substance.

15. The computer program according to claim 13, wherein
the exposure time is set such that the first Raman spectrum
is within a dynamical range of an optical sensor of the
spectrometer.

16. The computer program according to claim 13, wherein
the further exposure time is set such that the intensity of at
least one Raman peak of the further Raman spectrum
exceeds a dynamical range of an optical sensor of the
spectrometer.

17. The computer program accordingly to claim 13,
wherein the Raman spectroscopy system is a handheld
Raman spectroscopy system.

18. The computer program according to claim 13, wherein
the method to be executed further comprises:
forming a compound Raman spectrum based on identified
Raman peaks.

* * * * *